United States Patent

Fussell

[15] 3,679,969
[45] July 25, 1972

[54] MAGNETOMETER SENSOR DIGITAL AMBIENT NULLING SYSTEM

[72] Inventor: Richard L. Fussell, Chester Springs, Pa.
[73] Assignee: Burroughs Corporation, Detroit, Mich.
[22] Filed: June 1, 1971
[21] Appl. No.: 148,796

[52] U.S. Cl. .........................................................324/43 R
[51] Int. Cl. .......................................................G01r 33/02
[58] Field of Search ................................324/43 R, 47, 0.5, 8

[56] References Cited

UNITED STATES PATENTS 3,218,547  11/1965  Ling.........................................324/47
3,286,169  11/1966  Slonczewski.........................324/43 R Primary Examiner—Robert J. Corcoran
Attorney—Paul W. Fish, Edward J. Feeney, Jr. and Charles S. Hall

[57] ABSTRACT

A system is described for use with a magnetometer sensor to provide automatic cancellation of comparatively large steady state ambient magnetic field effects in order to sense the very small magnitude, very low frequency signal information. The system which is effective at the emplacement and initial actuation of the sensor as well as upon the subsequent occurrence of a gross ambient field change, causes a nulling voltage, electrically controlled in predetermined increments, to eliminate the ambient field effects. The resultant magnetometer sensor output responds to input information with full sensitivity and without the direct passband constraints introduced by other ambient nulling techniques.

10 Claims, 7 Drawing Figures

INVENTOR.
RICHARD L. FUSSELL
BY
Francis A. Varallo
AGENT

MAGNETOMETER SENSOR DIGITAL AMBIENT NULLING SYSTEM

CROSS REFERENCES TO RELATED APPLICATIONS

Although not limited thereto, the present system for digital ambient nulling may be applied to the thin film magnetometer sensors described and claimed in: (1) Ser. No. 691,901, which is U.S. Pat. No. 3,518,534, "Magnetometer Employing Dual Thin Magnetic Film Transducers" by Clifford J. Bader, and (2) Ser. No. 543,097, now U.S. Pat. No. 3,443,213, "Magnetometer Using Thin Film Transducer as Slope Detection Filter" by Clifford J. Bader, Richard L. Fussell and Arthur G. Barnett. Each of these patents is assigned to the same assignee as the present invention.

BACKGROUND OF THE INVENTION

Thin film magnetometer sensors of the type described in the reference patents are often employed in high sensitivity, remote emplacement, magnetic anomaly applications. A fundamental problem in the operation of such sensors is the need to separate the effect of the steady state earth's magnetic field which is of the order of ±0.6 oersted, from the signal information which may be less than $10^{-3}$ oersted and which may have a frequency of less than 0.1 hz. The problem is essentially the same in the two basic modes of operation of the thin film sensor when combined with operational amplifier. Such operation involves either magnetic (current mode) or voltage mode feedback.

The closed-loop output voltage for the two modes is a function of the steady-state field and the time-varying field of interest. It can be shown mathematically that the output voltage sensitivity includes both steady-state and time-varying terms where the steady-state term has a very much greater dynamic range. As a result the maximum sensitivity is constrained by the available minimum dc supply voltage range and the maximum magnetic ambient field amplitude expected to be encountered during operation. Utilizing typical design parameters, it has been found that the minimum detectable anomaly signal level is too small, by at least an order of magnitude to be detected and processed without additional amplification. On the other hand, additional dc amplification is restricted by the same voltage limits as the initial sensitivity factors and cannot be employed.

Previous solutions to the foregoing problem, where the time-varying small-signal gain is limited by ambient field magnitude and practical power supply voltage levels, have made use of integrating networks and ac coupling. In both cases the basic feature is the use of very long time constant networks which permit increased gain factors for very low frequency (less than 0.1 hz) information signals with minimal response to the ambient field steady-state effect. However, because of the very low frequency signals and resultant very long network time constants, a number of practical design, volume and cost constraints are created in connection with the linear network solutions.

The disadvantages of the network approach will be apparent from the following. Assuming typical operating parameters for the sensor wherein the maximum ambient field is ±0.5 oersted and the dc voltage (minimum) is ±5 volts, the maximum permissible dc sensitivity for the output voltage is 10 volts/oersted, which is 1 millivolt/$10^{116\ 4}$ oersted. With a minimum signal detection voltage requirement of 10 millivolts for the $10^{-4}$ oersted signal, it follows that ac amplification or gain boost of 10:1 must be incorporated for the 0.1 hz minimum signal frequency. Furthermore to prevent undue phase shift, the nearest single time constant network break frequency should be at 0.01 hz which is one decade removed from the minimum signal frequency.

Under these conditions, the required long RC time constants can be realized only by low-leakage capacitors on the order of tens of microfarads and stable, low noise resistors having megohm resistance values. Practical hardware thus requires relatively expensive, bulky, non-ideal network resistors and capacitors, and imposes additionally demanding requirements on the associated amplifiers for very high input impedance, very low input bias currents, very low input offset voltages and very low input noise currents. As to the use of large value resistors, the problem is complicated since metallic resistors generate noise in the form of spontaneous voltage fluctuations. Due to the extremely low level sensor output signals, the maximum value of the network resistors that can be successfully employed, is limited by noise considerations.

An additional problem created by the time constants associated with the linear networks is the need in many applications for rapid stabilization characteristics at initial system emplacement and after severe physical disturbances where the ambient magnetic field level is greatly altered as a result of the physical re-orientation of the sensor. With the use of the very long time constant networks described hereinbefore, the approach has been to provide switching devices that effectively reduce the resistance value of the resistors to permit rapid capacitor charge or discharge to the new, or initial, steady-state voltage conditions. Obviously, such a solution entails the use of special devices and control circuits. Moreover, the transition between short and long time-constant network conditions can create spurious analog effects. In order to keep such effects within tolerable operating limits, additional constraints on capacitor leakage, amplifier parameters and switch devices are created.

Another general solution to the basic problem of elimination or minimization of the ambient field constraint on sensor output dynamic range and sensitivity is that provided by an adjustable cancelling or nulling voltage. The latter may be employed either in a current mode feedback system in which the nulling voltage is converted to a current, or in a voltage mode feedback system. In either system, the sensor output may be manually adjusted, by way of the null voltage level setting, to be close to a consistent reference voltage level well within system voltage range limits, while directly providing as large an output sensitivity as may be required for subsequent signal detection circuit operation. The output signal conditions are independent of the steady-state ambient magnetic field and the ambient influence is absorbed by the independent null voltage conditions.

The manual system may be physically implemented by the use of mechanical devices such as a low impedance potentiometer or an adjustable voltage supply. However, it is readily apparent that such equipment is totally inappropriate for compact, battery powered, remote operation equipments.

The present invention, which is a non-manual, non-mechanical digital nulling system is believed to be the most practical solution to high sensitivity magnetic detection system design.

SUMMARY OF THE INVENTION

In accordance with the present invention there is provided in conjunction with a magnetometer sensor an automatic digital nulling system which is free of the disadvantages of the previously mentioned techniques.

The key elements of the system include a ripple counter and a digital to analog (D/A) converter. In operation, if the analog output of the sensor strays outside the voltage limits set by a comparator due to ambient field effects or any other reason, the condition is recognized and clock pulses derived from a source thereof are directed to the counter input. The counter advances successively in response to the clock pulses. The counter output terminals are coupled to a D/A resistor summing network. The output of the network is applied through a buffer amplifier to the sensor and provides negative feedback. The clock pulses continue to advance the counter until the sensor output voltage matches and then crosses the value of the comparator reference voltage. At this time, the clock pulses are inhibited from further advancing the counter and the accumulated count which corresponds to the required null voltage level is maintained until further correction is required. The sensor is free to respond to subsequent input signals with full sensitivity and without direct passband restrictions.

A principal advantage of the present system is its compatability with large scale integrated circuit technology and the achievement of true sensor system miniaturization and ruggedization. As compared with previous techniques, the system offers the following additional advantages:

a. It permits the elimination of ultra-long time constant integrating and/or differentiating networks.
b. It permits high sensitivity operation of the sensor-amplifier loop, and eliminates the need for additional amplifiers.
c. It eliminates signal phase shift through the realization of flat low-end frequency characteristics.
d. It precludes the need for the special circuits and components required for rapid turn-on and restabilization capability.
e. It eliminates bulky, expensive, non-ideal capacitors and resistors.
f. It eliminates spurious analog effects associated with network time constant switching.
g. It permits relaxed amplifier specifications critical, expensive-to-control parameters.
h. It is directly compatible with both current and voltage mode feedback sensor systems.

Other features of the invention will become more fully apparent in the detailed description of its various configurations and modes of operation which are described fully hereinafter.

DESCRIPTION OF THE PREFERRED EMBODIMENTS

Figure 1:
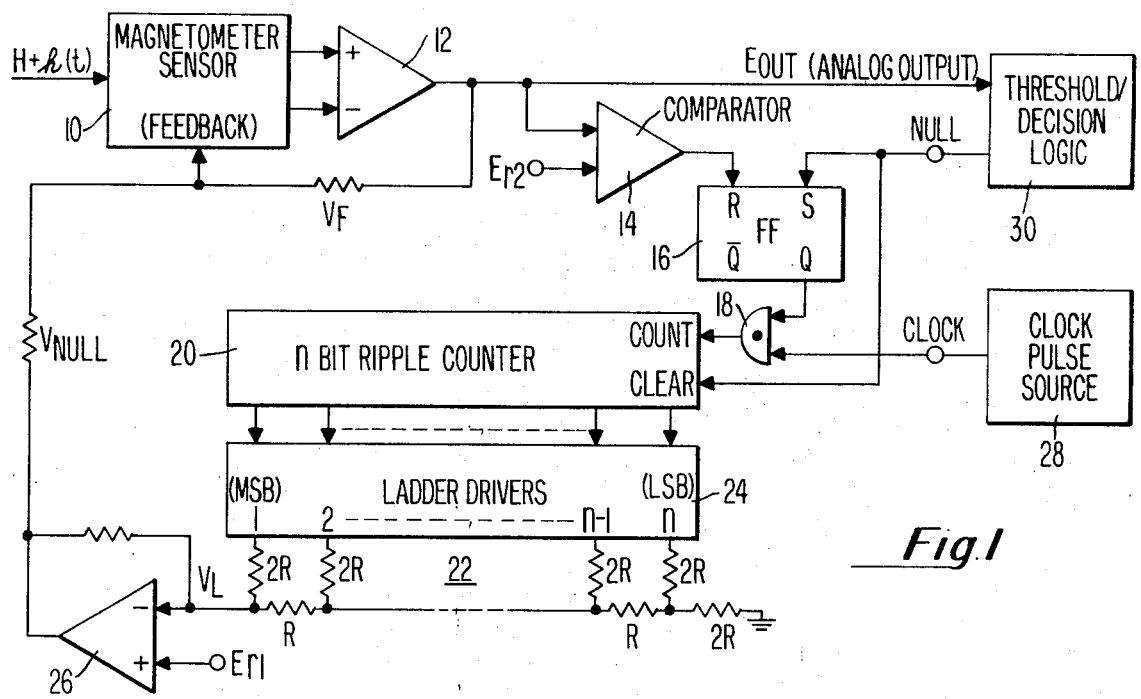
FIG. 1 is a diagram of the basic digital ambient null system of the present invention.

FIG. 1 illustrates the combination of a magnetometer sensor 10 with the basic ambient null system. The sensor may be of the thin magnetic film inductance variation types described in the referenced applications, although it should be noted that the present invention is not limited to such types. The sensor is subjected to a magnetic field environment which includes the steady-state field, H and the time-varying field of interest, $h(t)$. The basic digital null system includes the following major sections: a magnetometer sensor 10/amplifier 12; null status means comprising comparator 14; control logic means including flip-flop 16 and gating means such as AND gate 18; digital-to-analog means comprising an $n$ bit ripple counter 20, a resistance ladder network 22 and associated drivers 24; and an output amplifier 26. It should be understood that in an actual system, separate ladder drivers may not be required if the driving function can be performed by the counter itself. The counter length comprising $n$ bits is dictated by the ambient field nulling range and the resolution requirement, that is, the magnitude of the least significant bit (LSB), which is in turn dictated by the analog output small signal sensitivity.

Also shown in FIG. 1 is a clock pulse source 28 for supplying clock pulses to the counter and a threshold/decision logic block 30 having as an input, the analog output signal $E_{OUT}$, and providing as a control output, a signal on the NULL terminal to initiate the nulling operation. In practice the threshold/decision logic block 30 accepts the amplified sensor output information and provides by means of threshold switches an indication that a particular magnetic anomaly situation has occurred. This indication is processed by suitable decision logic to establish its validity. It should be noted that in the basic configuration of FIG. 1, the null operation required at emplacement may be initiated by a switch circuit within the block 30 which is responsive to power turn-on. As will become apparent in subsequent descriptions of practical null system configurations, the NULL initiation signals required after initial emplacement of the sensor may be generated within the system itself, subject to constraints and possible supplemental NULL initiation directed by the threshold/decision logic block 30. The characteristics of the logic block 30 may take numerous forms depending upon the application of the sensor. The particular form of decision logic to be employed rests with, and is well within the skill of, the logical designer.

The operation of the basic system of FIG. 1 is as follows. At sensor system power turn-on, or whenever the system must adjust for a gross ambient field change, a pulse signal from the threshold/decision logic 30 is applied concurrently to the NULL terminal and to the CLEAR terminal of counter 20. The pulse signal is coupled to the "S" terminal of flip-flop 16 and causes the latter to assume the set state and to provide a corresponding output on its Q terminal. The pulse applied to the CLEAR terminal of counter 20 causes the latter to be cleared, that is all bits restored to binary 0. With the counter cleared, the equivalent null voltage $V_{NULL}$ is zero, and the output of comparator 14 is also a logic 0. The Q output from flip-flop 16 is applied to AND gate 18 and enables the latter to pass the periodic clock pulses generated by clock pulse source 28 and appearing on the CLOCK terminal. The clock pulses are applied to the COUNT terminal of counter 20 causing the latter to advance one bit position for each clock pulse. The information stored in the counter at any given time represents an $n$ bit parallel-binary signal. Each bit of this last-mentioned signal is connected either directly or through a corresponding ladder driver (of the drivers 24) to its associated resistor element in the ladder network 22. The voltage $V_L$ appearing at the output of the ladder network 22 is applied to the negative terminal of operational amplifier 26, the output of which, $V_{NULL}$, is applied to the sensor 20 as a feedback signal. This feedback signal is combined with the customary feedback represented by $V_F$ which as noted in the reference patents provides stable magnetometer and amplifier performance with non-critical components and supply requirements. The amplifier 26 input terminal is returned to a reference potential $E_{r1}$. In practice, the $E_{potentials}$ $E_{r1}$ and $E_{r2}$ may be equal in magnitude, although operating conditions for certain applications may dictate the use of different potentials.

The equivalent null voltage will increase one increment for each one bit increase in the counter 20 content. As the amplitude of $V_{NULL}$ applied to sensor 10 increases, the sensor analog output voltage $E_{OUT}$ provided by operational amplifier 12 incrementally steps toward the reference voltage $E_{r2}$ appearing on one of the input terminals of comparator 14. When the sensor output voltage crosses $E_{r2}$, the comparator 14 output will shift to a level which when applied to the "R" terminal of flip-flop 16 causes the latter to switch from the set to the reset state. Such action terminates the existing flip-flop Q output and disables AND gate 18, thereby blocking subsequent clock pulses from the counter. The accumulated count in the counter which is the equivalent null voltage level is maintained until changed in response to another pulse applied to the NULL terminal.

In considering the basic design of the nulling system, the following quantitative requirements may be established for purposes of example and explanation. These requirements have been selected to be identical to those which might be used in the network nulling techniques discussed briefly hereinbefore.

1. Ambient field range $\Delta H = 1$ oersted
2. DC voltage range $E(min) = 10$ volts 3. Minimum signal detection required $h(t)(\min) = 10^{-4}$ oersted
4. Minimum detection signal voltage level for practical detection $E_s(\min) = 10$ millivolts
5. Detection sensitivity (from (3) and (4)) $e_h = 100$ volts/oersted
(6) Sensor amplifier loop response $f_b(\min) = 1$ KHz
(7) Detection circuit input voltage range $E_d(\min) = \pm 1$ volt
(8) Nominal detection circuit input voltage $E_D = 5$ volts The indicated detection circuit input voltage and range (5v ± 1v) immediately specifies the minimum null voltage increment ($\Delta V_{NULL}$) as 2 volts. The value of the reference voltage $E_{r2}$ will then be 4v or 6v ($E_d \pm 1$) depending on whether increasing null voltage causes an increase or decrease of sensor-amplifier output. The latter is dependent upon the feedback mode employed and the exact circuit configuration.

The ripple counter capacity of $n$ bits is then determined by the ratio of $\Delta V_{NULL}$, the ambient field range ($\Delta H$) and the detection sensitivity ($e_h$), according to the expression $$(2^n - 1) \Delta V_{NULL} \geq e_h \times \Delta H$$

Substituting the numerical values from the foregoing into the expression, yields $$(2^n - 1) \geq \frac{1 oe \times 100 \, v/oe}{2v}$$

$$(2^n - 1) \geq 50$$

which indicates that a counter length which comprises an $n$ of 6 bits is satisfactory for the assumed requirements.

It should be noted that in the basic system configuration of FIG. 1, the voltage supply conditions are unidirectional so that the reference voltages $E_{r1}$ and $E_{r2}$ are set to be near the voltage supply midrange, equal approximately to 5 volts. Consequently a zero ambient field condition will result in a ripple count to 50 $\tau°$ of capacity, that is $V_{NULL} \cong V\max/2$. A maximum ambient field of one polarity will result in a low count, $V_{NULL} \cong 0$ and a maximum ambient field of the opposite polarity will result in a high count, $V_{NULL} \cong V_{max}$. An alternative set of voltage conditions may be utilized in which the reference voltages would be placed near ground (zero) potential. In this case positive and negative supplies are required for the rest of the system with the ladder network returned to the negative supply potential. As in the preceeding example the ripple count is the source for the major ambient field limits but the resultant null voltages would be zero, −5v and +5v volts respectively for zero ambient field, and maximum ambient fields of one polarity and the other.

Another important consideration in the system design is the input clock rate and the resultant nulling time. The latter is limited by the sensor-amplifier high frequency response. The null voltage rise and fall time must be constrained to permit the sensor-amplifier loop to track without significant error. Where the null voltage increase is in small step increments, an exponential response at the sensor-amplifier output implies that the minimum clock period $T_{CLOCK}$ should be equal to $3/f_b$ where $f_b$ is the sensor amplifier loop response break point. Assuming an upper break frequency of 1KHz (min), it follows that $T_{CLOCK}$ (min) $\cong$ 3 milliseconds. The resultant maximum nulling time is $(T_{CLOCK})(2^61) = 3\text{ms} \times 63 = 189$ milliseconds, which is a practical period for the typical signal frequency of 0.1 hz.

In the preceeding consideration of the basic system of FIG. 1, no mention was made of the stability or drift characteristic of the sensor dc output as a function of temperature or aging. In such a simple system the sensor output drift may create major dc voltage changes, although such changes occur at a rate sufficiently separated from signal conditions for practical detection. The limit of tolerable drift magnitude is determined primarily by the detection device input voltage range and secondarily by the available dc dynamic range of the sensor. In general, the former is the limiting criterion for which the renulling operation must be constrained.

A question arises as to the required accuracy and stability of the digital-to-analog (D/A) converter. In anomaly-type magnetometer system which characteristically employ wide dc input range tolerant detectors, the design of the converter may be relaxed significantly. This is so because the nulling voltage feedback need not accurately represent the applied ambient field and the analog dc null level need not precisely match any reference level.

The D/A converter of FIG. 1 is of the well known resistor-ladder network variety. It should be noted that the actual converter configuration employed need not be of this type and the invention is not limited to its use. However the resistor-ladder network, although it requires more components than the weighted-resistor type D/A network in which a single resistor is used for each output, possesses certain advantages. The most significant advantage of the resistor-ladder network is that it can be constructed with only two-resistor values namely "R" and "2R". Since the magnitudes of the resistors are not more than a factor of two apart, and since all the resistors can be made at the same time with the same tools and materials, resistor-ladder networks of 0.025 $\tau°$ are readily available. Actually, ladder resistances are of the order of ± 1 $\tau°$ are adequate in the system of FIG. 1 for up to 14 bits of D/A capability. The latter are relatively easy to manufacture and are therefore reasonably low in cost.

In designing the D/A converter, the two criteria to be considered are that the largest positive bit-to-bit analog voltage change must be no larger than the analog value to the least significant bit (which represents the specified maximum deviation from the reference voltage acceptable for the sensor amplifier output following a nulling cycle); and that the analog value for the full binary count is sufficient to handle the system's dynamic range considerations.

In operation, the D/A converter accepts as an input by way of AND gate 18 digital clock pulses which cycle an $n$ stage binary ripple counter 20, typically comprised of a plurality of bistable flip-flop circuits. The counter provides a parallel-binary output signal of $n$ bits. Each flip-flop in effect has its output coupled to a resistor in the ladder network 22 and depending upon its bistable state, causes either of two voltage potentials (for example, the supply voltage or ground potential) to be applied to the corresponding resistor.

Figure 2:
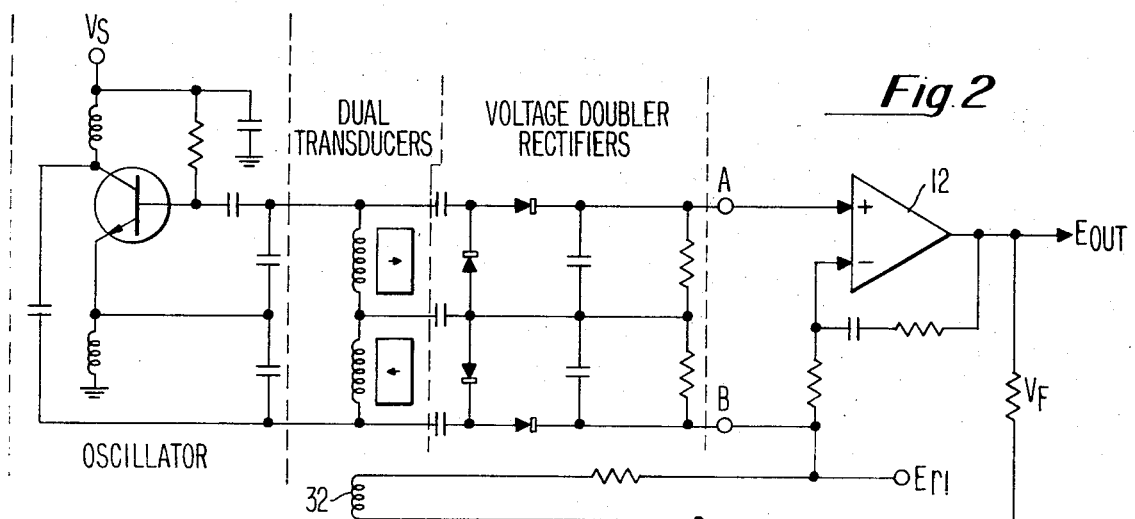
FIG. 2 illustrates the combination of the system of FIG. 1 with the thin film sensor of the reference (1) patent for operation in a current or magnetic feedback mode.
Figure 3:
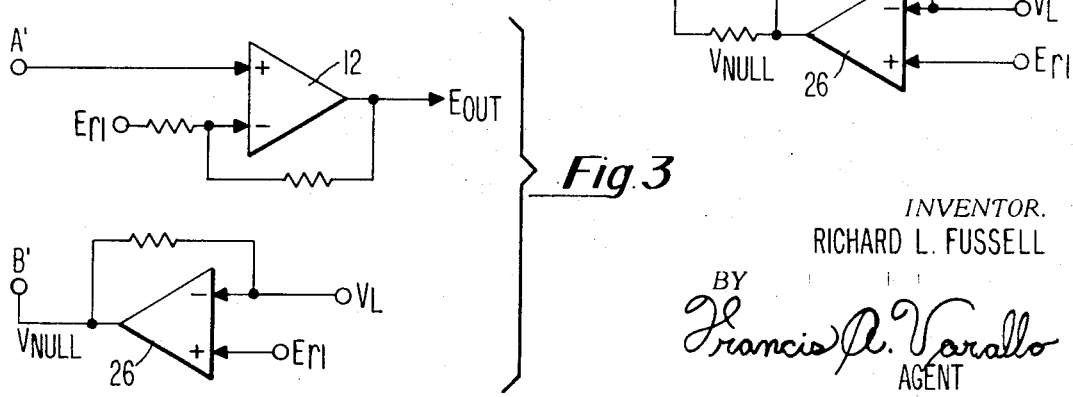
FIG. 3 depicts the combination of the system of FIG. 1 with the thin film sensor of the reference (1) patent for operation in a voltage feedback mode.

FIGS. 2 and 3 have been included to illustrate the electrical configuration comprising the system of FIG. 1 with a thin film magnetometer sensor of the type described in the reference U. S. Pat. No. 3,518,534. For simplicity, the control flip-flop, threshold/decision logic and clock pulse source blocks, and the D/A converter are not shown, although their presence should be assumed. As stated previously herein, the automatic null system of the present invention is suitable for use with different types of sensors, as will be apparent to those skilled in the magnetometer art. The combination of the present system with the sensor of the referenced patent is included solely for purpose of example and should not be considered limitative of the invention.

FIG. 2 is directed to the magnetic (current) mode of feedback sensor operation while FIG. 3 deals with a voltage mode.

Considering briefly the sensor depicted in FIG. 2, it is comprised of an oscillator, dual thin magnetic film transducers and cascade voltage doubler rectifiers. In operation, the pair of thin magnetic film transducers, physically arranged so that they have a common easy or sensitive axis, are magnetically biased (as indicated by the arrows) to opposite states of residual flux density along said axis. The transducers are electrically connected across a source of constant radio frequency (rf) voltage supplied by the oscillator. The rf voltages appearing across each of the transducers in response to a magnetic field applied concurrently thereto, are combined in detector circuits which produce the desired dc output signal indicative of the direction and strength of the applied field.

In FIG. 2, the output of the sensor appears across terminals A and B. Terminal A is coupled to the plus (non-inverting) input terminal of amplifier 12. Terminal B and the negative (inverting) terminal of amplifier 12 are each coupled to a source of reference potential $E_{r1}$. In accordance with the operation described in connection with FIG. 1, the output voltage $V_L$ of the ladder 22 is applied to one of the input terminals of amplifier 26. The other amplifier input terminal is returned to reference potential $E_{r1}$. The null voltage $V_{NULL}$ at the output of amplifier 26 causes current flow through winding 32 which is inductively coupled to the dual transducers. Current also flows through winding 32 as a result of $V_F$. Thus winding 32 provides the combined negative magnetic feedback generated by $V_{NULL}$ and $V_F$. It should be understood that if desired, separate feedback windings coupled to the transducer inductors can be utilized in place of winding 32 to provide the respective feedback effects. The feedback configuration is such that for each positive increment of $V_{NULL}$, the analog output $E_{OUT}$ of the sensor amplifier 12 is decreased proportionately. Obviously, the converse is also true.

In FIG. 3 the output terminals A and B of the magnetometer sensor of FIG. 2 are now assumed to be connected respectively to terminals A' and B'. Sensor amplifier 12 has its input terminals connected respectively to sensor terminal A' and to a reference potential $E_{r1}$. Null amplifier 26 receives an output $V_L$ from the ladder network (not shown) on one of its input terminals. Its other input terminal is coupled to reference voltage $E_{r1}$. The $V_{NULL}$ voltage appearing at the output of amplifier 26 is applied directly to the sensor output terminal B' where it functions as negative voltage feedback with respect to the sensor output.

In a practical null correction sensor system, the null correction activity must be indicated to and controlled by associated threshold detection and decision logic functions. The latter are required to prevent the occurrence of null correction activity in conjunction with a valid time-varying signal. Such activity would destroy the signal identity and create spurious analog voltage output effects. A HOLD (null) condition must thus be exerted by the associated threshold/decision logic functions of block 30 when a valid input signal has achieved or exceeded a detection threshold condition, and must be maintained until signal processing is complete. A null correction in PROCESS signal to the associated functions must also be provided to inhibit responses to analog level adjustments. These controls, namely HOLD and PROCESS are in addition to the previously described dominant NULL command and CLOCK signal.

Figure 4:
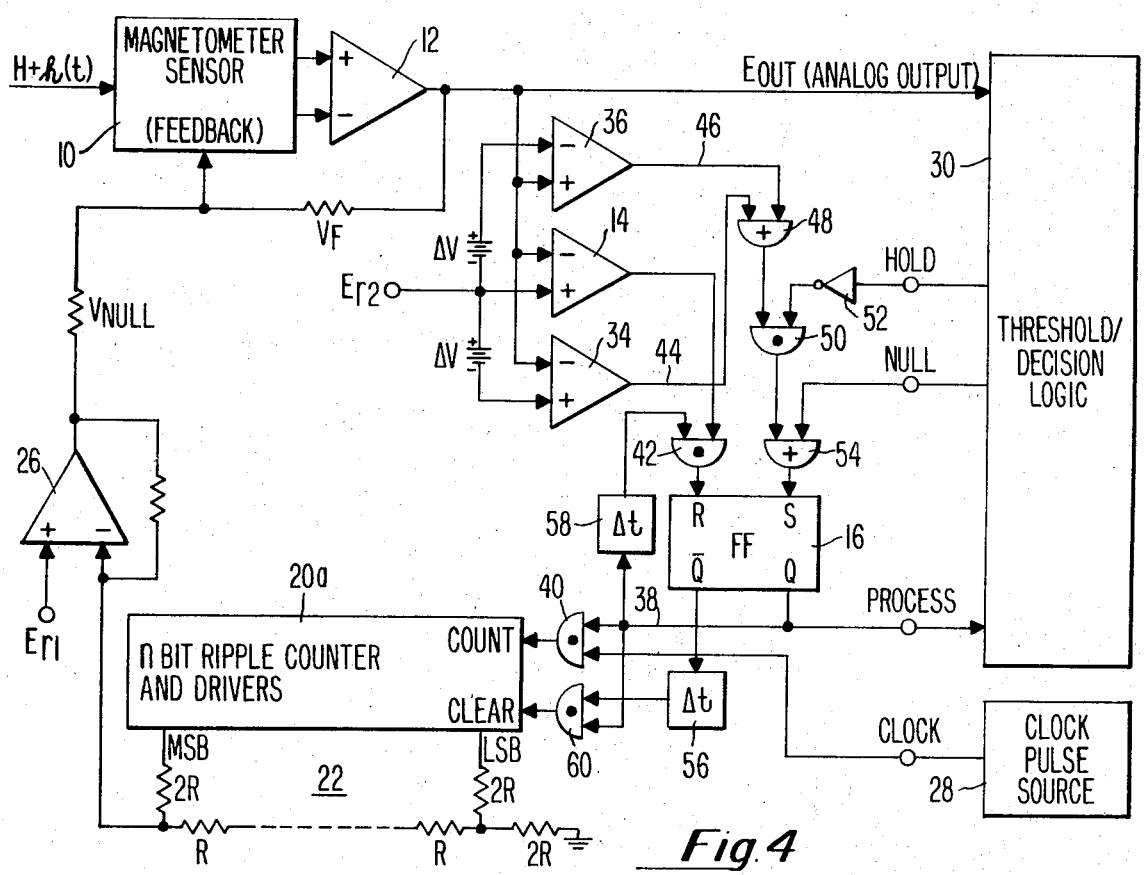
FIG. 4 depicts a digital ambient null system with voltage band correction.

FIG. 4 illustrates a digital ambient null system with voltage band correction which incorporates the practical operational and control features mentioned above. Comparison of FIG. 4 with the basic configuration of FIG. 1 reveals the addition of two drift limit comparators 34 and 36 with offset voltages ($E_{r2} - \Delta V$ and $E_{r2} + \Delta V$) and the mode control logic gates.

Initial or dominant null activity is identical to that of the basic system of FIG. 1, resulting in an analog output dc null condition close to the reference voltage $E_{r2}$ as controlled by comparator 14 well within the $\pm \Delta V$ voltage band range. Once initial or gross null is achieved, the state of the comparator 14 output is ignored because of the latch conditions existing on AND gate 42 as a direct result of the flip-flop Q output which is now equivalent to logic 0. Since the Q output appearing on line 38 and applied to one of the input terminals of AND gate 40 is a 0, clock pulses from source 28 are prevented form entering the counter COUNT terminal.

So long as the analog output level from the sensor 10/ operational amplifier 12 combination remains within the voltage band defined by $E_{r2} \pm \Delta V$, the drift limit comparators 34 and 36 provide a logic 0 output on lines 44 and 46 respectively and the null control flip-flop 16 will remain in its reset condition. However, when the analog output level exceeds the designated voltage band, either comparator 34 or comparator 36 will yield a logic 1 output. This output passes through OR gate 48 and is applied to one of a pair of input terminals of AND gate 50. Assuming that the threshold/decision block 30 applies no signal to the HOLD terminal, that is, no analysis of the analog output information of the sensor is in progress, logical inverter 52 will cause an enabling signal to appear on the other input terminal of AND gate 50 with the result that the output of the last-mentioned gate passes through OR gate 54 and effects the setting of flip-flop 16. Thus, a null cycle is initiated which is identical to the initial or gross null action. The drift condition is effectively absorbed in the null voltage as though it were an ambient field change, which operation is acceptable in a magnetic anomaly detector system.

Finally, FIG. 4 includes a pair of small time delay function blocks 56 and 58 which are operative during the asynchronous setting and resetting of flip-flop 16 and serve to prevent time-race effects which could result in spurious outputs. For example, when the flip-flop is driven to the set state at the initiation of a null cycle, a Q output is applied to AND gate 60. The delay function block 56 insures that the $\overline{Q}$ output will be available in concurrence with the Q output on the input terminals of gate 60, the resulting output of gate 60 providing a clear pulse to the ripple counter 20a which includes the aforementioned ladder driver capability. Similarly, delay block 58 insures the concurrence of signals from the Q output terminal of flip-flop 16 and the output of comparator 14 at the input terminals of AND gate 42 to effect the resetting of the flip-flop.

Figure 5:
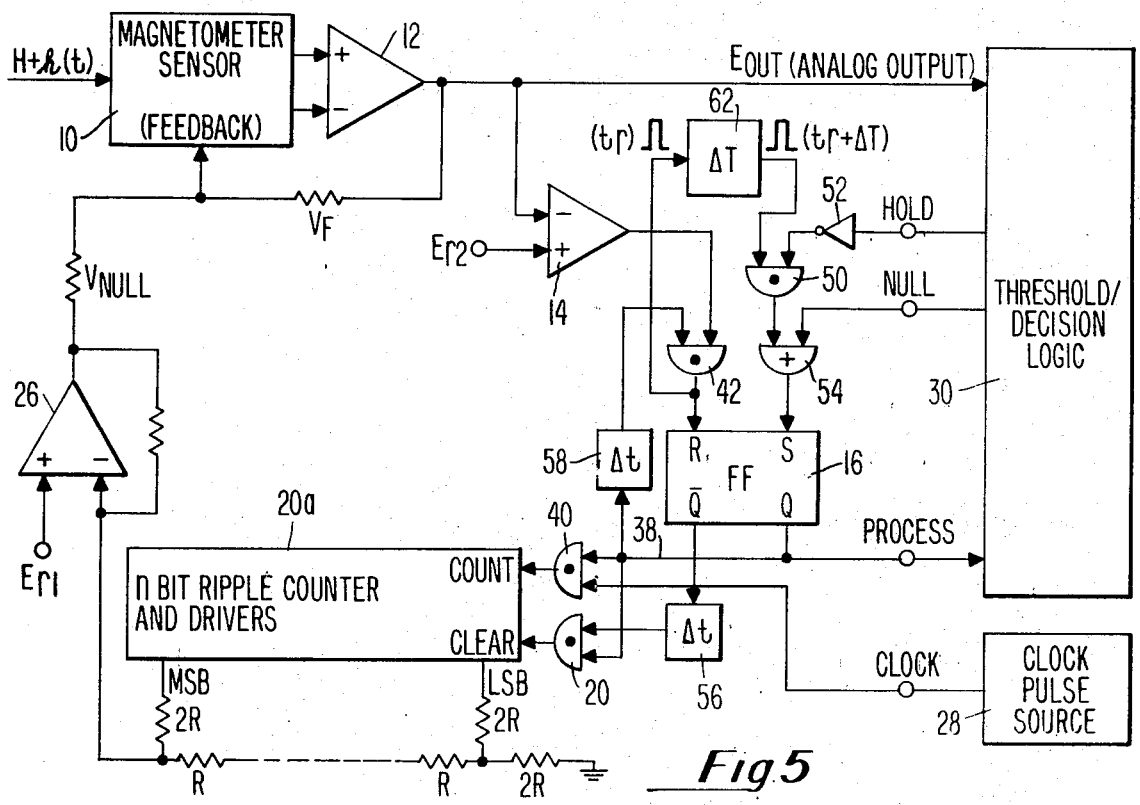
FIG. 5 is a diagram of a digital ambient null system incorporating a time or periodic correction feature.

FIG. 5 illustrates a digital ambient null system with a time or periodic correction capability. As compared to the system of FIG. 4, the delay function, represented by block $\Delta T$ bearing the reference numeral 62 controls the length of time between successive nulling operations. The components of FIG. 5 which have counterparts in FIG. 4 are designated by like reference numerals.

The initial null, gross re-null and periodic re-null actions in the configuration of FIG. 5 are all identical to the previous configurations described herein in connection with FIGS. 1 through 4. At the end of any null action a flip-flop reset pulse appears at the output of AND gate 42 as a result of the operation of comparator 14. The pulse duration of the reset pulse is a function of $\Delta t$, block 58. Assuming that this reset pulse occurs at time $t_r$, it is applied to the delay function block 62 and initiates a delay period $\Delta T$. delay block 62 yields an output pulse at a time $(t_r + \Delta T)$, to set flip-flop 16 by way of gates 50 and 54 (provided a HOLD signal is not present), thereby initiating a new null action. With no HOLD signal present, renulling action takes place periodically without the need for a signal on the NULL terminal. Each action involves a complete clearing of the counter, through the concurrence of the Q and $\overline{Q}$ inputs to gate 60. However if the threshold/decision logic 30 is analyzing the sensor analog output at time $(t_r + \Delta T)$, the presence of a signal on the HOLD terminal will, through the action of inverter 52, prevent the delay block 62 output pulse from producing an output from gate 50. Thus flip-flop 16 remains in the reset state and the periodic renulling action inherent in the system of FIG. 5 will be temporarily suspended. At the termination of the signal processing in block 30, the threshold/decision logic will provide a signal on the NULL terminal to re-establish the nulling sequence. At the same time, the signal appearing on the HOLD terminal is terminated. It should be noted that significant analog output drift has not necessarily occurred when null correction again commences, although the system design must guarantee that an analog output drift greater than that permitted in the voltage band correction cannot occur within the $\Delta T$ period. As would also be true for voltage band correction, there is a statistically predictable probability of missing a very small percentage of input signals as a result of asynchronous null correction initiation immediately before a detection threshold occurrence. For time corrections, the signal "miss" statistics are primarily dependent upon the period between corrections namely $\Delta T$, the actual nulling time required in correction action, and the predicted rate of signal occurrences. In the configuration of FIG. 4 with voltage band correction, the "miss" statistics include the worst-case analog output drift rate instead of the period, $\Delta T$, between corrections.

Figure 6:
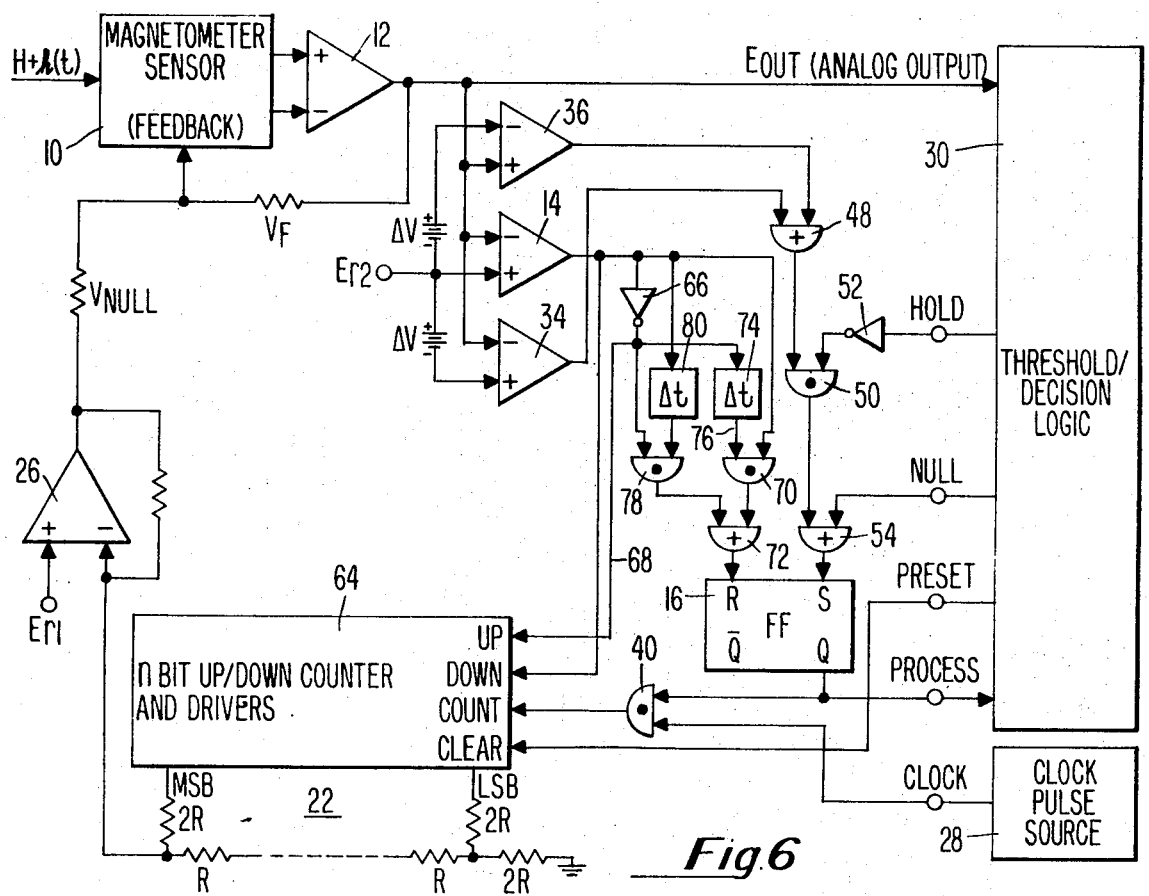
FIG. 6 illustrates a null system utilizing incremental voltage band correction.
Figure 7:
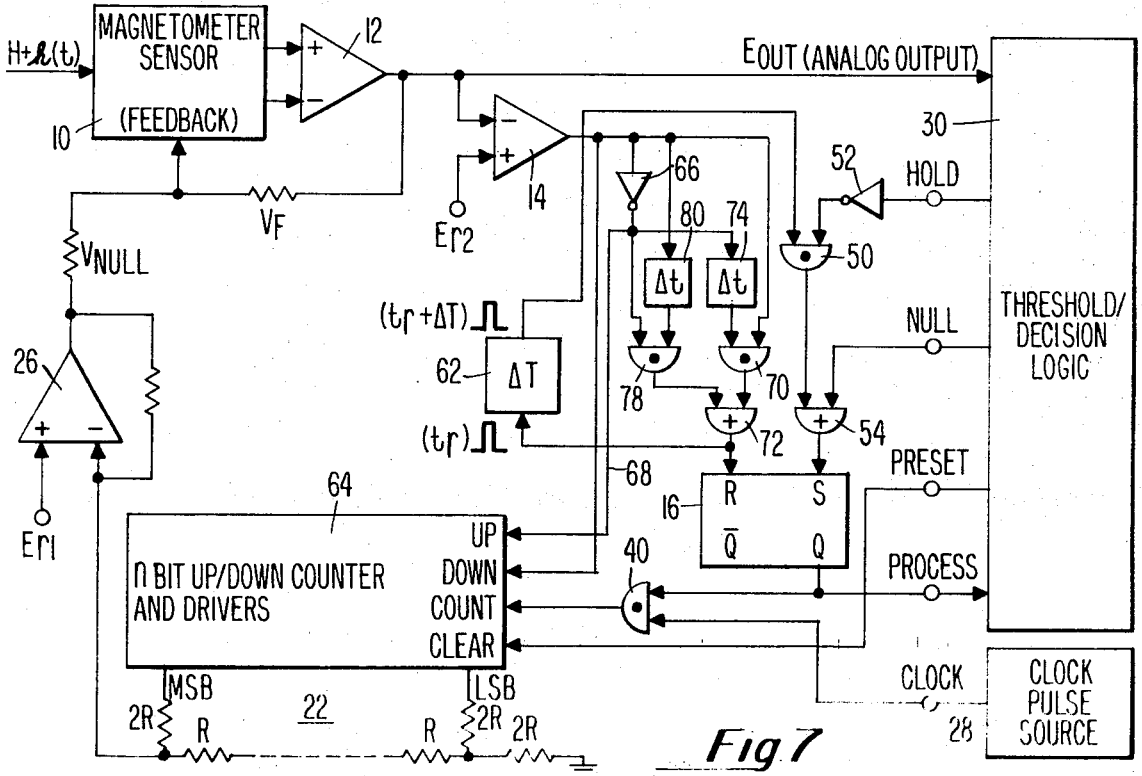
FIG. 7 depicts an ambient null system similar in some respects to that of FIG. 6 but providing incremental time correction.

The configurations of ambient null systems depicted in FIGS. 4 and 5 are satisfactory for a wide variety of applications. However, for applications where the nulling time and degree of analog output voltage disturbance associated with a "complete" counter clear and re-null operation create problems, an "incremental" approach may be employed at the expense of increased hardware complexity. FIGS. 6 and 7 illustrate respectively incremental null correction with voltage band and time initiation. An "up/down" ripple counter 64 capable of bi-directional counting is used in place of the unidirectional count up or count down counters 20 and 20a employed in the foregoing configurations. In conjunction with the use of an up/down counter it also follows that analog output drift sense or polarity must be established for counter control.

FIG. 6 shows an incremental voltage band correction system incorporating three comparators 14, 34 and 36 as in FIG. 4 and an up/down ripple counter 64. With this configuration, operation is significantly different between initial (or gross) null action and null correction action.

In the initial or gross null action, pulses are applied concurrently to both the preset and null input terminals by the threshold/decision logic 30 to completely clear the counter 64 and set the control flip-flop 16 by way of OR gate 54 to its "S" null mode state. At this time comparator 14 provides an output logic 0 signal, which is inverted by inverter 66 to a logic 1 and is applied via line 68 to the UP terminal of counter 64. This action conditions the counter to count upward in response to clock pulses from source 28. As in the previously described configurations, the count accumulates to a point where the null voltage $V_{NULL}$ causes the analog output to switch the comparator 14 output to the logic 1 state. This action causes the resetting of flip-flop 16 by virtue of the coincidence of signals on the input terminals of AND gate 70 and the passage of a reset pulse through OR gate 72. The $\Delta t$ delay block 74 insures the presence of a logic 1 on line 76 at the time immediately following the switching of comparator output to the 1 state, thereby eliminating possible time-race effects. A steady-state condition is thus established where the counter accumulation and corresponding null voltage are maintained.

In the following description of the operation of FIG. 6, involving the logic status of the comparator outputs under various conditions, the notation "C" along with the subscript reference numeral of the designated comparator will be used. Also, the nature of the logic signal appearing on various terminals will be provided, with for example, the shorthand notation UP = 1, meaning "the signal on the UP terminal of counter 64 is a logic 1 or another example, Q = 0, "the output on Q terminal of flip-flop 16 is a logic 0". The sense of the analog output drift is derived from the basic reference comparator, $C_{14}$ only, since $C_{14} = 0$ indicates $E_{OUT} > E_{r2}$ and $C_{14} = 1$ indicates $E_{OUT} < E_{r2}$. As a result, the counter UP command is $\overline{C_{14}}$ and the counter DOWN command is $C_{14}$.

In addition, the command to terminate incremental correction action is derived directly from the output of comparator $C_{14}$ via the transition from 0 to 1 or 1 to 0 in the form of a control flip-flop 16 reset pulse at the output of OR gate 72. The outputs of the drift limit comparators 34 and 36 are used only to set the control flip-flop to its null mode state contingent on the absence of a HOLD signal from the associated threshold/decision logic functions 30.

In order to better understand the functioning of the system configuration of FIG. 6 under various conditions, the following typical operating conditions are described in detail.

In a first case, it is assumed that the analog output is within the voltage band $\pm \Delta V$, but is above the reference $E_{r2}$. Null logic is at steady state. This may be expressed as
$E_{r2} < E_{OUT} < (E_{r2} + \Delta V)$
$C_{14} = 0$; UP = 1; DOWN = 0
$C_{34} = C_{36} = 0$
$R = 0$; $S = 0$
$Q = 0$; $\overline{Q} = 0$
COUNT = 0

As a result, no null mode activity is occurring since the analog output is within the controlled voltage band ($\pm \Delta V$).

Assume further in a second case that the analog output exceeds the voltage band above the reference. Null logic activity is initiated.
$E_{OUT} \geq (E_{r2} + \Delta V)$
$C_{14} = 0$; $C_{36} = 1$
$R = 0$; $S = 1$
$Q = 1$; $\overline{Q} = 0$
COUNT = 1

Null correction action is established and the counter 64 adds one bit for the occurrence of each clock pulse, causing $V_{NULL}$ to increase and $E_{OUT}$ to decrease toward $E_{r2}$ until cycle termination.

As $E_{OUT}$, the analog output, decreases toward the reference voltage $E_{r2}$, the output of comparator $C_{36}$ returns to 0, eliminating the control flip-flop set condition only. Then:
$E_{r2} < E_{OUT} < (E_{r2} + \Delta V)$
$C_{14} = 0$
$C_{34} = C_{36} = 0$
$R = 0$; $S = 0$
$Q = 1$; $\overline{Q} = 0$
COUNT = 1

The termination of the logic activity takes place as follows. When the analog output crosses $E_{r2}$, the $C_{14}$ output change from 0 to 1 produces a single flip-flop reset pulse, causing null activity termination with the following end conditions:
$(E_{r2} - \Delta V) < E_{OUT} < E_{r2}$
$C_{14} = 1$; UP = 0; DOWN = 1
$C_{34} = C_{36} = 0$
$R = 0$; $S = 0$
$Q = 0$; $\overline{Q} = 1$
COUNT = 0

The analog output is again free to respond to input signals until drift causes either comparator $C_{34}$ or $C_{36}$ to be switched to the 1 state.

A third typical condition is one in which the analog output is within the prescribed voltage band, but is below the reference voltage $E_{r2}$. This is the condition represented by the termination of null activity just described in connection with the preceding case. Moreover, as in the first case, since the analog output is within the controlled voltage band, no null activity is initiated.

In a fourth case, it is assumed that the analog output exceeds the voltage band below the reference potential. Null logic activity is initiated as indicated by the following:
$E_{OUT} < (E_{r2} - \Delta V)$
$C_{14} = 1$; UP = 0, DOWN = 1
$C34 = 1$; $C_{36} = 0$
$R = 0$; $S = 1$
$Q = 1$; $\overline{Q} = 0$
COUNT = 1

Under these conditions, null correction action is again established and the counter 64 subtracts one bit for each clock pulse it receives, causing $V_{NULL}$ to decrease and $E_{OUT}$ to increase toward the reference, $E_{r2}$. $C_{34}$ returns to 0 eliminating the control flip-flop set condition only. Then:
$(E_{r2} - \Delta V) < E_{OUT} < E_{r2}$
$C_{14} = 1$
$C_{34} = C_{36} = 0$
$R = 0$; $S = 0$
$Q = 1$; $\overline{Q} = 0$
COUNT = 1

When the analog output crosses $E_{r2}$, $C_{14}$ output changes from 1 to 0, the action of inverter 66 causes a 1 to appear on one of the input terminals of AND gate 78 in concurrence with a 1 on its other input terminal from the delay block 80. The pulse output of OR gate 72 is applied to the "R" terminal of the flip-flop to reset the latter. This results in null activity termination with end conditions identical to those of the first case described hereinbefore.

FIG. 7 depicts the system organization for incremental time correction. A time delay ($\Delta T$) function identified as block 62 provides incremental null mode actuation. All other aspects of the system of FIG. 7 are identical to those of FIG. 6 and like reference characters have been used in both figures.

The operation of the system of FIG. 7 is as follows. Assume that initial system turn-on the threshold/decision logic 30 applies respective trigger pulses to the PRESET terminal (coupled to the counter CLEAR terminal) and to the NULL terminal. The pulse to the latter terminal travels via OR gate 54 to the "S" terminal of flip-flop 16. Assuming that $E_{OUT}$, the analog output applied to comparator 14 is less than the reference voltage $E_{r2}$, the comparator 14 output represents a logic 0. Through the action of inverter 66 and line 68 the count UP terminal of counter 64 is also in the 1 condition. Conversely the count DOWN terminal of counter 64 is a 0.

The output on the Q terminal of flip-flop 16 is coupled to AND gate 40, which also receives the clock pulses appearing on the CLOCK terminal, and derived from source 28.

The counter 64 counts upward one bit at a time, causing an incremental increase in the feedback voltage $V_{NULL}$ and a corresponding decrease in the analog output applied to comparator 14. When the output voltage crosses and becomes less than the $E_{r2}$ reference level, the output of comparator 14 switches from the logic 0 to the 1 state. This causes the counter DOWN terminal to become a logic 1, and the UP terminal, a 0. Through the delay action of block 74, two concurrent signals appear on the input terminals of AND gate 70 which produces an output. This last output is coupled in turn through OR gate 72 to the "R" terminal of flip-flop 16 where a pulse at $t_r$ time resets the flip-flop. This action terminates for a predetermined time the null correction activity, since the Q terminal of the flip-flop is now a logic 0.

The system of FIG. 7 provides for time or periodic correction. The pulse which reset flip-flop 16, is also coupled at time $t_r$ to a delay $\Delta T$ function block identified by reference character 62. At a time, $(t_r + \Delta T)$, an appropriate output pulse from block 62 is applied to AND gate 50, and if no signal is applied to the HOLD terminal by the threshold/decision logic block 30, the concurrence of 1 signal inputs on AND gate 50 (logical inverter 52 providing one of the inputs) cause an output therefrom. This last-mentioned output is coupled via OR gate 54 to the "S" terminal of the flip-flop to initiate another null correction cycle.

In this latest cycle, assuming that $E_{OUT}<E_{r2}$ either because of the preceeding null cycle or other occurrence during the $\Delta T$ time period, the counter counts DOWN, subtracting one bit at a time, decreasing the feedback to the sensor, and increasing $E_{OUT}$. This action causes $E_{OUT}$ to ultimately cross over and exceed the level of $E_{r2}$. Comparator 14 output switches from the logic 1 to 0 and through the action of delay function $\Delta t$, block 80, appropriate concurrent inputs are applied to AND gate 78. The output pulse of the latter gate, is coupled through OR gate 72 to the "R" terminal of flip-flop 16 where it resets the flip-flop, temporarily terminating null correction activity, and also initiating the delay time $\Delta T$ of block 62.

It will be apparent that this null correction activity will be periodic that is, spaced apart by the predetermined interval $\Delta T$, which may be chosen for the particular application. Even if the analog output has not varied from one null cycle to the succeeding one, the null activity will consist of a slight alteration in $E_{OUT}$, sufficient to cause the comparator 14 output to oscillate between the 0 and 1 logic states.

From the foregoing description of the invention, it should be apparent that the present digital ambient nulling system when used with a magnetometer sensor, provides an efficient and reliable means for cancellation of unwanted steady state magnetic field effects. Various configurations which make use of the inventive concept have been presented herein and cumulatively are believed to encompass most applications for which the system is required. However, it should be understood that changes and modifications of the circuit arrangements described herein may be needed to fit particular operating requirements. These changes and modifications, insofar as they are not departures from the true scope of the present invention, are intended to be covered by the claims appended hereto.

What is claimed is:

1. A digital ambient nulling system for use with a magnetometer sensor comprising in combination
    sensor amplifier means operatively connected to said magnetometer sensor for amplifying the information output signals therefrom,
    comparator means coupled to said sensor amplifier means for receiving the amplified sensor output signals and for comparing said signals to reference potentials of predetermined magnitude, said comparator means providing output levels indicative of the null state of said system,
    digital-to-analog converter means including a counter, said converter means generating null voltages proportional to the instantaneous count accumulated in said counter, clock pulse means operatively connected to said counter to supply count pulses thereto,
    control means coupled to said comparator means and to said digital-to-analog converter means and being responsive to the output levels of said comparator means for controlling the total number of count pulses received by said counter in any null cycle and hence the corresponding null voltage output of said digital-to-analog converter,
    null voltage amplifier means operatively connected to said digital-to-analog converter means for amplifying the null voltage outputs therefrom, and means coupled to said null voltage amplifier means and to said magnetometer sensor for feeding-back the amplified null voltages to said sensor in proper relationship to cancel from the sensor output signals, the effect of the steady state magnetic fields which coexist with the desired signal information in the magnetic field environment to which the sensor is subjected.

2. A digital ambient nulling system as defined in claim 1 wherein said control means includes a flip-flop circuit and logic gating means, said flip-flop circuit having set and reset terminals and respective corresponding first and second output terminals, said logic gating means comprising an AND gate having a pair of input terminals and an output terminal, the set terminal of said flip-flop being adapted to receive NULL pulses from a source thereof, the output of said comparator means being coupled to the reset terminal of said flip-flop, means coupling said first output terminal of said flip-flop to one of the input terminals of said AND gate, said clock pulse means being coupled to the other input terminal of said AND gate, the output terminal of said AND gate being coupled to said counter.

3. A digital ambient nulling system as defined in claim 2 wherein said counter is a binary ripple counter having a plurality of stages, said digital-to-analog converter further including a resistive ladder network and means for coupling said counter stages to respective resistive members of said network, said clock pulse means supplying count pulses to said ripple counter, the latter accumulating said count during any null cycle and storing said count subsequent thereto, said resistive ladder network having an output terminal for supplying said null voltage outputs.

4. A digital ambient nulling system as defined in claim 3 wherein said sensor amplifier means and said null voltage amplifier means are operational amplifiers each having a pair of input terminals and an output terminal, the input terminals of said sensor amplifier being coupled respectively to the output terminals of said sensor, the output terminal of said sensor amplifier being coupled to said comparator means, the input terminals of said null voltage amplifier being coupled respectively to the output terminal of said ladder network and to a source of reference potential, the output terminal of said null voltage amplifier being coupled to said sensor to provide an amplified null voltage feedback signal thereto.

5. A digital ambient nulling system as defined in claim 1 wherein said comparator means comprises first, second and third comparators, each of said comparators having a pair of input terminals and an output terminal, means coupling the amplified sensor output signals in common to an input terminal of each of said comparators, the other input terminal of said first comparator being coupled to a source of reference potential, the other input terminals of said second and third comparators being coupled respectively to potentials, less than and greater than the magnitude of said reference potential, said former potentials establishing a control voltage band within which the magnitudes of the amplified sensor output signals are to be constrained by the system, said control means including a flip-flop circuit and logic gating means, said flip-flop circuit having set and reset terminals and respective corresponding first and second output terminals, said logic gating means coupling the output terminals of said second and third comparators to the set terminal of said flip-flop, said logic gating means further coupling the output terminal of said first comparator to the reset terminal of said flip-flop, the occurrence of an amplified sensor output signal having a magnitude outside said voltage band causing a predetermined logic level on the output terminals of either said second or third comparators, which level is capable through the action of said logic gating means of switching said flip-flop to its set state thereby initiating a null cycle, said logic gating means being further coupled to said counter and to said first and second flip-flop output terminals and being responsive to the setting of said flip-flop for clearing said counter and permitting the subsequent receipt and accumulation of count pulses thereby, the passage of the value of the amplified sensor output signal through that of said reference potential causing a logic level on the output terminal of said first comparator, which latter level is capable through the action of said logic gating means of switching said flip-flop to the reset state, thereby terminating the null correction cycle in progress.

6. A digital ambient nulling system as defined in claim 5 wherein said control means further includes first and second delay means, said logic gating means comprising first and second OR gates, first, second, third and fourth AND gates and logic inverter means, each of said gates having a pair of input terminals and an output terminal, the output terminals of said second and third comparators being coupled to the respective input terminals of said first OR gate, the output terminal of said first OR gate being coupled to one of the input terminals of said first AND gate, the other input terminal of said first AND gate being coupled by said logic inverter to a source of HOLD pulses, the output terminal of said first AND gate being coupled to one of the input terminals of said second OR gate, the other input terminal of said second OR gate being adapted to receive NULL pulses from a source thereof, the output terminal of said second OR gate being coupled to the set terminal of said flip-flop, the output terminal of said first comparator being coupled to one of the input terminals of said second AND gate, said first delay means coupling said flip-flop first output terminal to the other input terminal of said second AND gate, the output terminal of said second AND gate being coupled to the reset terminal of said flip-flop, the input terminals of said third AND gate being coupled respectively to said flip-flop first output terminal and to said clock pulse means, the output terminal of said third AND gate being coupled to said counter and providing COUNT pulses thereto, said second delay means coupling said flip-flop second output terminal to one of the input terminals of said fourth AND gate, the other input terminal of said fourth AND gate being coupled to said flip-flop first output terminal, the output terminal of said fourth AND gate being coupled to said counter and providing CLEAR pulses thereto.

7. A digital ambient nulling system as defined in claim 5 wherein said counter is capable of providing an incrementing or decrementing count in response to the respective logic levels impressed on its UP and DOWN terminals by said first comparator, said counter also having COUNT and CLEAR input terminals, said control means further including first and second delay means, said logic gating means comprising first, second and third OR gates, first, second, third and fourth AND gates, and first and second logic inverter means, each of said gates having a pair of input terminals and an output terminal, the output terminals of said second and third comparators being coupled to the respective input terminals of said first OR gate, the output terminal of said first OR gate being coupled to one of the input terminals of said first AND gate, the other input terminal of said first AND gate being coupled by said first logic inverter means to a source of HOLD pulses, the output terminal of said first AND gate being coupled to one of the input terminals of said second OR gate, the other input terminal of said second OR gate being adapted to receive NULL pulses from a source thereof, the output terminal of second OR gate being coupled to the set terminal of said flip-flop, the output terminal of said first comparator being connected to said DOWN terminal of said counter and being coupled by said second logic inverter means in common to the UP terminal of said counter and to one the input terminals of said second AND gate, said first delay means coupling the output terminal of said first comparator to the other input terminal of said second AND gate, said output terminal of said first comparator also being connected to one of the input terminals of said third AND gate, said second delay means coupling the second logic inverter output level to the other input terminal of said third AND gate, the output terminals of said second and third AND gates being coupled respectively to the input terminals of said third OR gate, the output terminal of said third OR gate being coupled to the reset terminal of said flip-flop, the input terminals of said fourth AND gate being coupled respectively to said flip-flop first input terminal and to said clock pulse means, the output terminal of said fourth AND gate being coupled to said counter COUNT terminal, and means coupling said counter CLEAR terminal to a source of preset signals.

8. A digital ambient nulling system as defined in claim 1 wherein said comparator means comprises a comparator having a pair of input terminals and an output terminal, means coupling the amplified sensor output signals to an input terminal of said comparator, the other input terminal of said comparator being coupled to a source of reference potential, said control means including a periodic delay means, a flip-flop circuit and logic gating means, said flip-flop circuit having set and reset terminals and respective corresponding first and second output terminals, said logic gating means coupling the output terminal of said comparator to the reset terminal of said flip-flop, said periodic delay means having an input terminal and an output terminal, the input terminal of said delay means being coupled to the reset terminal of said flip-flop, said logic gating means further coupling the output terminal of said periodic delay means to the set terminal of said flip-flop, the passage of the value of the amplified sensor output signal through that of said reference potential causing the output of said comparator to attain a predetermined logic level, said latter level providing through said logic gating means a pulse on the reset terminal of said flip-flop, the switching of said flip-flop to the reset state terminating the null correction cycle in progress, said last-mentioned pulse being applied to said periodic delay means and initiating therein a delay period of predetermined length, said periodic delay means generating an output pulse at the termination of said period, said logic gating means applying said last-mentioned output pulse to the set terminal of said flip-flop, the switching of said flip-flop to the set state initiating a new null cycle.

9. A digital ambient nulling system as defined in claim 8 wherein said control means further includes first and second delay means, said logic gating means comprising an OR gate, first, second, third and fourth AND gates and logic inverter means, each of said gates having a pair of input terminals and an output terminal, the output terminal of said periodic delay means being coupled to one of the input terminals of said first AND gate, the other input terminal of said first AND gate being coupled by said logic inverter means to source of HOLD pulses, the output terminal of said first AND gate being coupled to one of the input terminals of said OR gate, the other input terminal of said OR gate being adapted to receive NULL pulses from a source thereof, the output terminal of said OR gate being coupled to the set terminal of said flip-flop, the output terminal of said comparator being coupled to one of the input terminals of said second AND gate, said first delay means coupling said flip-flop first output terminal to the other input terminal of said second AND gate, the output terminal of said second AND gate being coupled in common to the reset terminal of said flip-flop and to input terminal of said periodic delay means, the input terminals of said third AND gate being coupled respectively to said flip-flop first output terminal and to said clock pulse means, the output terminal of said third AND gate being coupled to said counter and providing count pulses thereto, said second delay means coupling said flip-flop second output terminal to one of the input terminals of said fourth AND gate, the other input terminal of said fourth AND gate being coupled to said flip-flop first output terminal, the output terminal of said fourth AND gate being coupled to said counter and providing clear pulses thereto.

10. A digital ambient nulling system as defined in claim 8 wherein said counter is capable of providing an incrementing or decrementing count in response to the respective logic levels impressed on its UP and DOWN terminals by said comparator, said counter also having COUNT and CLEAR input terminals, said control means further including first and second delay means, said logic gating means comprising first and second OR gates, first, second, third and fourth AND gates, and first and second logic inverter means, each of said gates having a pair of input terminals and an output terminal, the output terminal of said periodic delay means being coupled to one of the input terminals of said first AND gate, the other input terminal of said first AND gate being coupled by said first logic inverter means to a source of HOLD pulses, the output terminal of said first AND gate being coupled to one of the input terminals of said first OR gate, the other input terminal of said first OR gate being adapted to receive NULL pulses from a source thereof, the output terminal of said first OR gate being coupled to the set terminal of said flip-flop, the output terminal of said comparator being connected to said DOWN terminal of said counter and being coupled by said second logic inverter means in common to the UP terminal of said counter and to one of the input terminals of said second AND gate, said first delay means coupling the output terminal of said comparator to the other input terminal of said second AND gate, said output terminal of said comparator also being connected to one of the input terminals of said third AND gate, said second delay means coupling the second logic inverter output level to the other input terminal of said third AND gate, the output terminals of said second and third AND gates being coupled respectively to the input terminals of said second OR gate, the output terminal of said third OR gate being coupled in common to the reset terminal of said flip-flop and to the input terminal of said periodic delay means, the input terminals of said fourth AND gate being coupled respectively to said flip-flop first output terminal and to said clock pulse means, the output terminal of said fourth AND gate being coupled to said counter COUNT terminal, and means coupling said counter CLEAR terminal to a source of preset signals.

* * * * *